United States Patent [19]
Maycock et al.

[11] Patent Number: 5,808,671
[45] Date of Patent: Sep. 15, 1998

[54] APPARATUS AND METHOD FOR REMOTE MONITORING OF VIDEO SIGNALS

[75] Inventors: John Charles Maycock, Vancouver; Carey Todd Ritchey, Port Moody; Vincent Maddock Smith, Matsqui, all of Canada

[73] Assignee: Augat Photon Systems Inc., Burnaby, Canada

[21] Appl. No.: 561,874

[22] Filed: Nov. 22, 1995

[30] Foreign Application Priority Data

Nov. 24, 1994 [CA] Canada ................................. 2136567

[51] Int. Cl.⁶ ..................................................... H04N 5/00
[52] U.S. Cl. ............................ 348/180; 348/189; 348/192
[58] Field of Search ..................................... 348/180, 189, 348/6, 12, 13, 181, 184, 192, 193

[56] References Cited

U.S. PATENT DOCUMENTS

| | | | |
|---|---|---|---|
| 4,550,407 | 10/1985 | Couasnon et al. | 358/10 |
| 4,558,358 | 12/1985 | Onda | 358/86 |
| 4,760,442 | 7/1988 | O'Connel et al. | 358/86 |
| 4,845,711 | 7/1989 | LeFort et al. | 370/102 |
| 4,991,011 | 2/1991 | Johnson et al. | 358/141 |
| 5,329,311 | 7/1994 | Ward et al. | 348/180 |
| 5,510,855 | 4/1996 | Kawakami et al. | 348/695 |

*Primary Examiner*—Mark R. Powell
*Assistant Examiner*—Vivek Srivastava
*Attorney, Agent, or Firm*—Weingarten, Schurgin, Gagnebin & Hayes LLP

[57] ABSTRACT

Apparatus for and a method of monitoring the transmission of an analog video signal through a video signal transmission channel, e.g. a fiber optic cable from a headend capturing the analog video signal at a location remote from the headend and select a signal channel from the captured video signal. The selected signal channel is digitized and serialized as a digital signal and the digital signal is transmitted as an optical signal through an optical fiber cable to a monitoring location, where the digital signal is converted to an analog video signal which is displayed on a video monitor.

28 Claims, 5 Drawing Sheets

APPARATUS AND METHOD FOR REMOTE MONITORING OF VIDEO SIGNALS

BACKGROUND OF THE INVENTION

1. Field of the Invention

The present invention relates to apparatus for and a method of monitoring video signals being transmitted through, for example, a co-axial cable, an optical fiber cable, a terrestrial microwave or a satellite system.

2. Description of the Related Art

The benefit of a cable television system to its subscribers is measured not only by the quantity of channels and/or entertainment provided, but also increasingly by the signal quality. To determine the quality of its transmission, cable TV operators have relied upon the measurement of operating parameters of amplifiers employed in co-axial cable in the system as an indirect indication of the transmitted signal quality passing through the amplifiers. Data derived from the parameters, such as power, temperature, and housing status (i.e. open or closed), is encoded by a status monitoring modem and transferred into a return path frequency allocation of the co-axial cable, typically in the frequency band 5 to 35 MHZ. The modem would typically consist of a simple analog-to-digital converter with polling capability from the forward path signal. CATV status monitoring systems such as this are commercially available at the present time. Some provide data on the noise performance of the network. Each unit is addressable and the data it provides is interpreted at a headend into a display using proprietary software.

The critical parameters of cable television system performance comprises the quality of the picture and the audio signal. The quality of the video and audio signals is affected principally by noise and distortion. It is not possible to accurately detect most distortion parameters using the RF detection methods used by the prior art monitoring systems. Hence they are usually referred to as "status monitoring" systems rather than "performance monitoring" systems, since they detect the status of the equipment being monitored at a selected point but not the quality of the signals passing through that point. To obtain a true representation of the quality of a video signal, specific measurements must be undertaken on the baseband signal and confirmed by observation of an actual picture.

The addition of fibre optics to the technologies used for cable television has increased the distances over which signals are transmitted. For example, one SCM transmission system which is commercially available at the present time uses 1550 nm technology to transmit over 80 channels of audio and video programming over 200 km. This system uses optical amplifiers positioned approximately every 50 to 60 km. To monitor performance, the return path would have to be duplicated almost in its entirety to bring the return path signals back to the headend for detection. This would add difficulty and cost to the design of the system. The return path frequency band (5 to 35 MHZ) is notoriously difficult to use due to ingress of other RF signals on the same frequency. Historically, this has restricted the status monitoring to simple data feeds. The bandwidth of a return fibre path is very underutilized if used for only this simple status monitoring information.

In addition, the analog format of the signals gives rise to path length related degradation. As the path loss increases, then so the carrier level in reference to the noise floor of the system decreases, thereby decreasing the carrier-to-noise level. With the present am-vsb CATV signal format, this translates directly to a decrease in signal-to-noise ratio and manifests itself as "snow" in the picture. In the return path, the same limitation will eventually make the received carrier level indistinguishable from the noise floor, resulting in a total loss of signal. This limits the distance over which analog transmission can take place. The cost to build a return path system over several hundred kilometers would equal that of the forward path, making the system prohibitively expensive.

The optical amplifiers used in the above-mentioned commercially available system represent the state-of-the-art of leading edge fibre optics technology applied to cable television systems. While their operation is stable, the process of optical amplification cannot be monitored by conventional means. Therefore, to determine the performance, either indirect electrical parameters must be measured, as in the case of an RF amplifier in a co-axial cable, or another method must be employed.

BRIEF SUMMARY OF THE INVENTION

According to the present invention, apparatus for monitoring the transmission of a video signal from a headend employs means at a location remote from the headend for capturing the video signal. The captured video signal is passed to a channel selector, which selects a signal channel from the captured video signal. The selected channel is then demodulated, digitized and serialized in a digitizer and transmitted as a digital video signal to a monitoring location, where it is converted back into an analog video signal for display on a monitor and test equipment.

The monitoring location may be at the headend or elsewhere, and the video signal may be transmitted from the headend through an optical fibre cable provided with one or more optical amplifiers, the means for capturing the video signal comprising a coupler located at the output of one of the optical amplifiers or at some other location.

The present apparatus can thus provide at the monitoring location, in addition to all of the data provided by the above-mentioned prior art systems, baseband video and audio signals for both visual and quantitative measurement without any path loss-related degradation. Also, the present apparatus may be used with amplitude modulated vestigial side band signals (i.e. the normal CATV format) and, with suitable modification, for compressed digital signals of the future and satellite frequency modulated signals in both analog and digital formats.

BRIEF DESCRIPTION OF THE DRAWINGS

The present invention will be more readily apparent from the following description of preferred embodiments thereof when taken in conjunction with the accompanying drawings, in which.

THE PREFERRED EMBODIMENT

Figure 1:
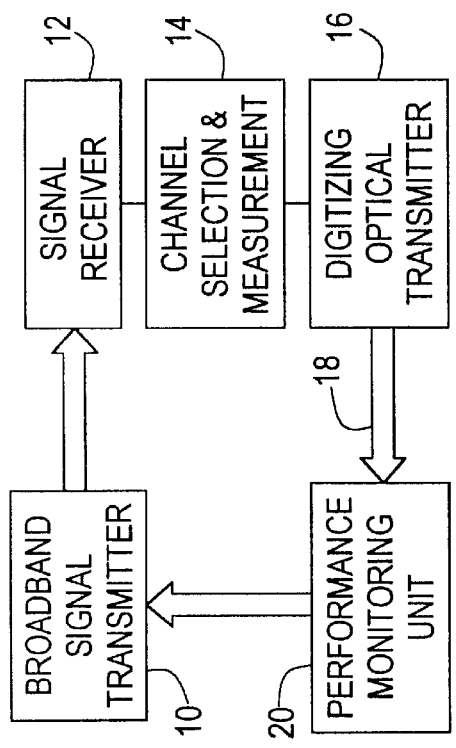
FIG. 1 shows a block diagram illustrating in a general manner a video signal transmission monitoring system embodying the present invention.

Referring firstly to FIG. 1, a video signal transmission headend 10 in the form of a broadband transmitter provides analog video signals which are received at a remote predetermined site or location by a signal receiver 12. The signal receiver 12 may be an optical receiver, an antenna, or any other device which enables the capture of a broadband signal to provide an electrical equivalent in a useable frequency range. A channel selector 14 selects from the received signal a channel to be monitored and measures parameters of the selected signal. Corresponding measurement data and the selected received entire video signal are transmitted by a digitizing optical transmitter 16 over a signal link or conduit in the form of a fibre optic cable 18 to a monitoring unit 20 at a monitoring location, which may be at the headend or at some other location.

In the monitoring unit 20 the signal is recovered and displayed on a video monitor (not shown) and analysed both for audio and video content and the measurement data is compared with reference data stored for the purpose. The channel selection is made manually by an operator or automatically by a control computer (not shown) at the monitoring location. Channel selection information for operating the channel selection device 14 is embedded into the transmitted video signal emanating from the transmitter at the headend 10 and is interpreted by the channel selection device at the remote site.

Figure 1A:
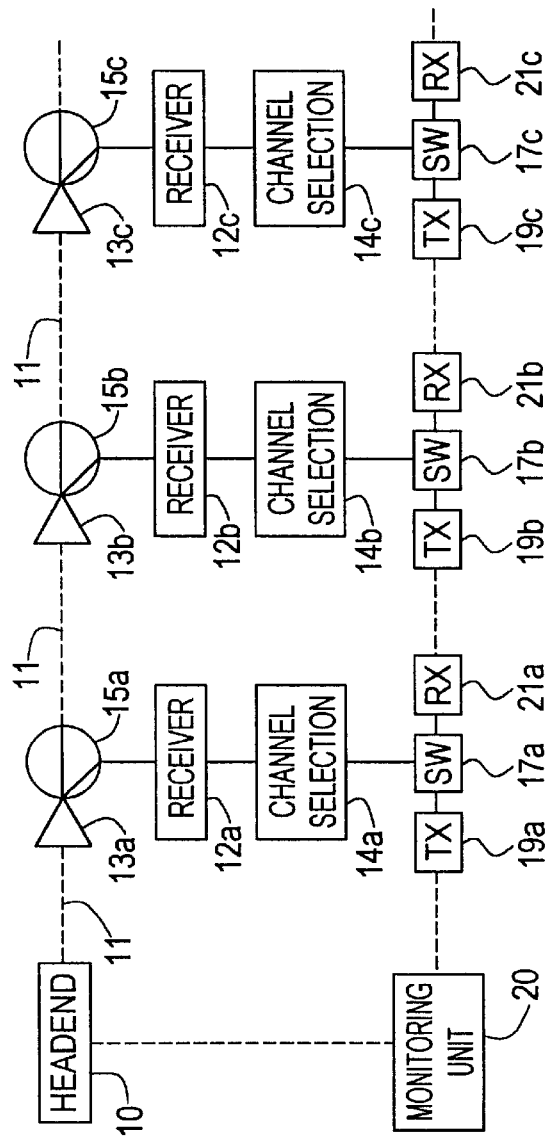
FIG. 1A shows a block diagram of an embodiment of the present monitoring system applied to a cascaded video signal transmission system.

FIG. 1A shows a somewhat more complicated transmission and monitoring system than that of FIG. 1. As shown in FIG. 1A, the headend 10 is connected to an optical fibre cable 11 for transmitting the video signal, the cable being provided with optical amplifiers 13a, 13b . . . 13n in cascade at respective predetermined locations or sites, each of which has, at its output, an optical coupler in the form of a splitter 15a, 15b . . . 15n for capturing the video signal and supplying it to a respective signal receiver 12a, 12b . . . 12n and a channel selector 14a, 14b . . . 14n, corresponding to the signal receiver 12 and the channel selector 14 of FIG. 1. The outputs of the channel selectors 14a, 14b. . . 14n are connected to respective, electronic two-way switches 17a, 17b . . . 17n connected between respective opto-electronic transmitters 19a, 19b . . . 19n and opto-electronic receivers 21a, 21b . . . 21n in a common signal conduit link comprising an optical fibre cable 18.

At each amplifier 13a, 13b . . . 13n, the video signal is captured and the channel is selected by the respective channel selector 14a, 14b . . . 14n. The selected signal and the associated measurement data are provided as one input to the respective switch 17a, 17b . . .. 17n. Upon command from the monitoring location, as described in greater detail below, the switch 17a, 17b . . . 17n can select either this selected local signal from the respective channel selector 14a, 14b . . . 14n or a signal from the respective receiver 21a, 21b . . . 21n. The central monitoring location can thus analyse the signal selected at any of the channel selectors 14a, 14b . . ..14n. Since the signal from each transmitter 19a, 19b . . . 19n is in a digital format, it can be repeated almost indefinitely without any loss of information.

Figure 2:
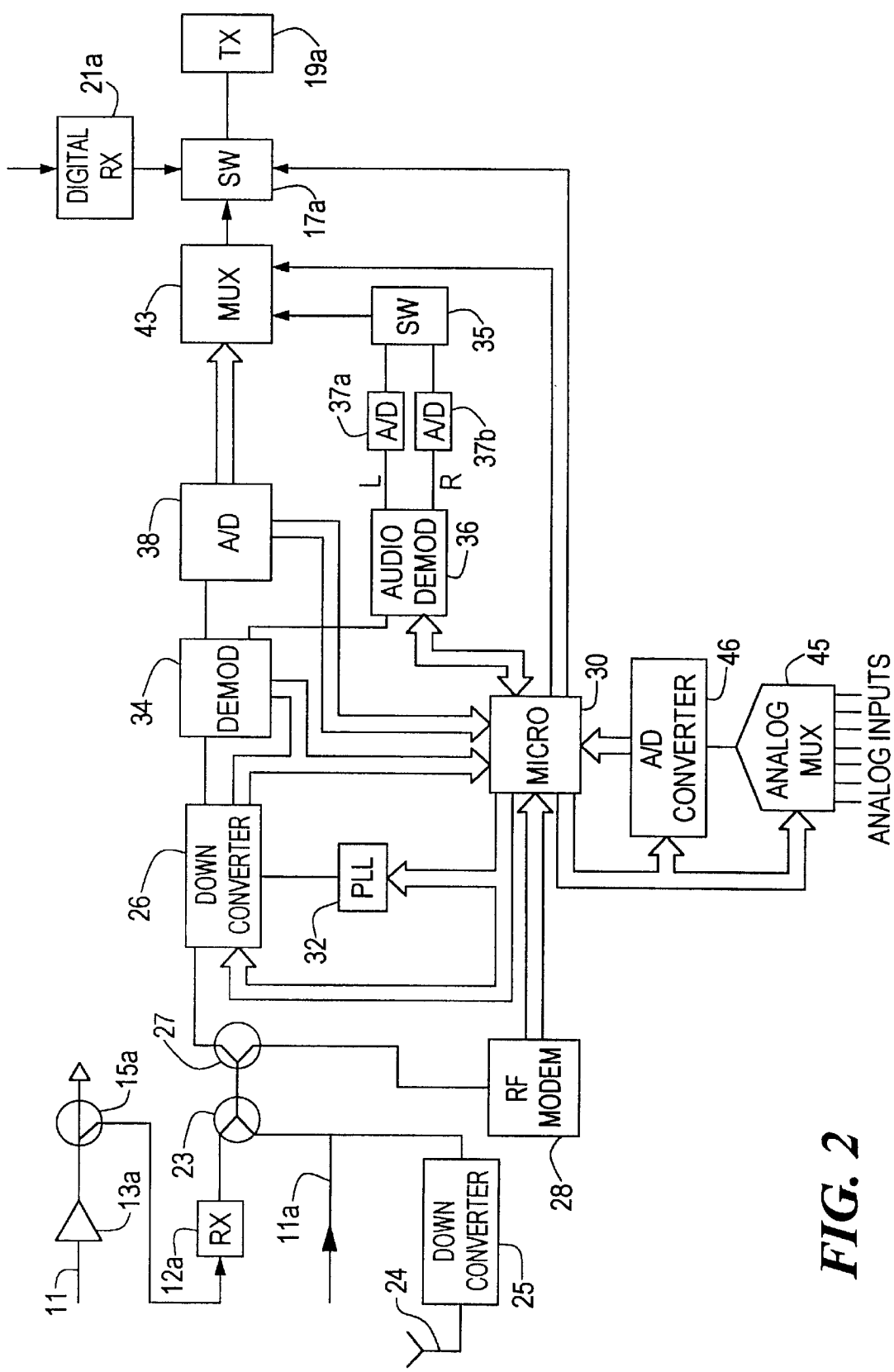
FIG. 2 shows a block diagram of parts of the monitoring system of FIG. 1A at a location remote from the headend of the system.

FIG. 2 shows in block diagram form the components of the channel selector 14a, which obtains the analog video signal from the cable 11 by an input comprising the optical splitter 15a and the receiver 12a, which receives the optical signal extracted by the optical splitter 15a and converts it into an electrical RF signal. The optical receiver 12a is of known construction and comprises a PIN diode coupled to an RF amplifier.

In case the optical fibre cable 11 is replaced by a co-axial cable 11a for transmitting the video signal as an electrical RF signal, and in this case the input comprises an RF coupler 23. A further alternative is to employ as the input an antenna 24 for receiving the video signal as a radio signal, which is supplied to a down convertor 25 connected to the coupler 23.

The RF signal is split by a splitter 27, one leg being fed to a down converter 26 and the other leg being sent to an RF modem 28. The modem 28 demodulates programming information comprising a channel selection control signal sent by a central processor (not shown) as a data carrier generated in the headend. The control signal is interpreted by a microprocessor 30 and used to control the frequency of a phase locked loop 32. This frequency in turn controls the frequency of the down converter 26 and thereby effects the video signal channel selection. The frequency of the down converter output is typically an IF signal of 45.75 MHZ. The output of the down converter 26 is fed to a first demodulator 34, which turns the IF signal into a baseband signal in the 0 to 6 MHZ range (for an NTSC system). This signal consists of NTSC video information including luminance, a chrominance subcarrier and an audio subcarrier. Similar compositions but with different frequency components would be employed for a PAL or SECAM signal.

The demodulator 34 has two output paths. A first path extends to an audio demodulator 36 and the other extends to an analog-to-digital converter 38.

The resolution of the analog-to-digital converter 38 is chosen carefully so as not to degrade the performance of the received signal. In the present embodiment of the invention, the analog-to-digital converter 38 provides 8 bit resolution giving a theoretical signal-to-noise ratio of approximately 60 dB. The demodulator 34 has a signal-to-noise ratio of about 52 dB, and since visual problems are visible at about 45 to 48 dB, the digitizing process has sufficient headroom so as not to degrade the signal being sent to the monitoring location.

The audio demodulator 36 turns the BTSC encoded audio subcarrier into stereo left and right audio channels. Other appropriate demodulators would be used to demodulate mono audio and/or secondary audio programming (SAP). For stereo audio, the audio demodulator 36 has two outputs for the left and right stereo channels, respectively. The two stereo channels are further encoded by analog-to-digital converters 37a and 37b, followed by a high speed multiplexer 35 which converts the two serial bitstreams from the analog-to-digital converters 37a and 3 7b to a single serial bitstream for input to a multiplexer 43.

The output from the analog-to-digital converter 38 is an 8 bit parallel format and the multiplexer 43 is designed to accept 10 parallel bits. In addition to the eight bits from the analog-to-digital converter 38, one bit comes from the audio multiplexer 35 and the final bit comprises digital data information from the microprocessor 30. To ensure accurate decoding and recovery at the monitoring unit 20, error correction codes are embedded and transmitted as overhead bits.

The digital data information is supplied as direct feed from the microprocessor 30 and comprises digitally encoded information comprising signal quality data indicative of the quality of the selected channel of the analog video signal and local status information provided by the microprocessor 30. The signal quality data comprises the video carrier power level obtained from the down converter 26, the video carrier frequency obtained from the phase locked loop 32, the audio carrier frequency obtained from the demodulator 34 and the audio carrier level obtained from the audio modulator. The local status information is provided in the form of analog inputs to an analog multiplexer 45. The amplifier 13a comprises an amplifier sold by Photon Systems Corp. of Burnaby, B.C., Canada as Model No. LT4000-A and incorporates means for providing, as such local status information, analog signals indicating the amplifier status. The analog inputs may also include temperature and other local status information from sources known in the art. Under the control of the microprocessor 30, the analog multiplexer 45 effects port-to-port sampling of these analog inputs and measures the values of these inputs as analog values, which it inputs to an analog-to-digital converter 46, which outputs corresponding digital data to the microprocessor 30. The multiplexer 45 and the analog-to-digital converter 46 are both controlled by the microprocessor 30.

An alternative arrangement, which is not shown in the drawings but which is appropriate where fast sampling is required, employs individual analog-to-digital converters for converting respective ones of the analog inputs into digital inputs to a digital multiplexer, which is sampled by the microprocessor 30.

The multiplexer 43 encodes the parallel input signals into a high speed serial bitstream, which is one of the inputs to the high speed switch 17a, which can be made to select between two input positions based on a signal from the local microprocessor 30, which in turn is based on a signal received from the headend 10. The second input to the switch is from the local digital receiver and reprocessor 21a, which recovers a digital bitstream from the next transmitter in line, i.e. the transmitter 19b, and reconstructs a clean signal consisting of the usual ones and zeros. Depending on the state of the switch, the corresponding signal is used as an input to the digital optical transmitter 19a for transmission back to the headend 10.

The channel selectors 14b . . . 14n are similar to the channel selector 14a.

Figure 1B:
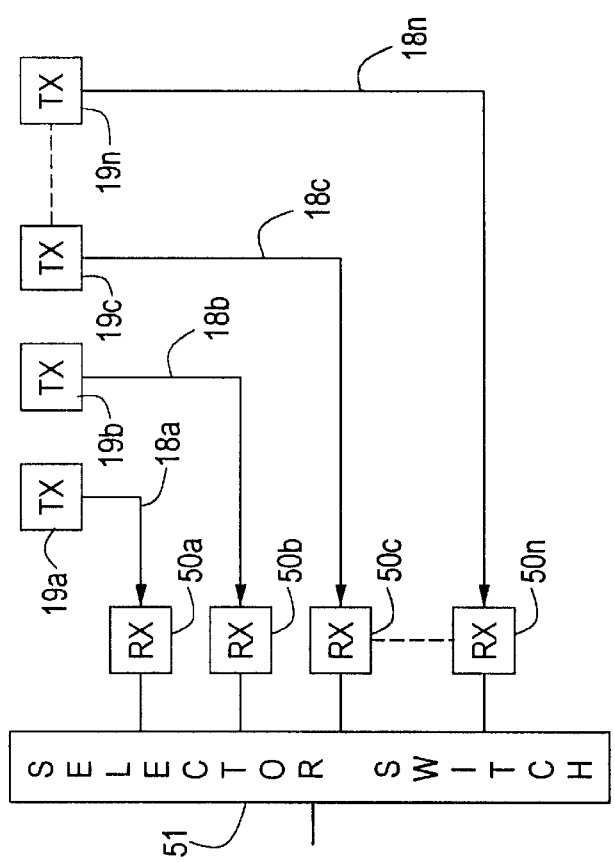
FIGS. 1B and 1C show block diagrams of two further embodiments of the present monitoring system.

The digitally encoded format of the video and audio baseband signal sent to the monitoring location may be digitally repeated many times without degradation of the signal. As an alternative to repeating the signal, a plurality of respective signal conduits in the form of individual fibre-optic cables 18a, 18b . . . 18n may be provided, as shown in FIG. 1B, for connecting the transmitters 19a, 19b . . . 19n to respective receivers 50a, 50b . . . 50n, provided with a selector switch 51, at the monitoring location.

Figure 1C:
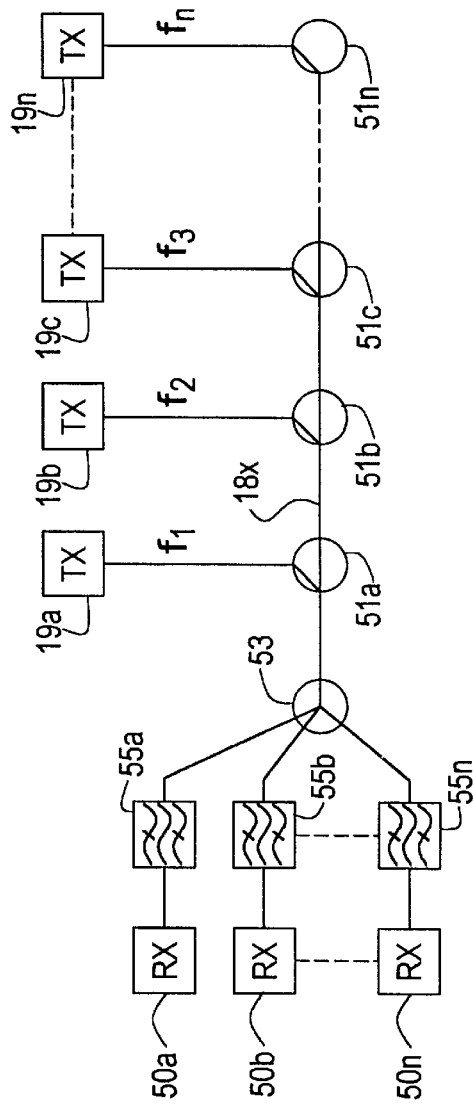

Another possible arrangement is illustrated in FIG. 1C, in which each transmitter 19a, 19b . . . 19n is connected by a respective coupler 51a, 51b . . . 51n to a common signal conduit comprising a fibre-optic cable 18x, which may comprise the video signal transmission cable 11. In this case, each of the transmitters 19a, 19b . . . 19n has a respective optical wavelength $f_a, f_b \ldots f_n$. These wave lengths are demultiplexed at the monitoring location by a splitter 53 and filtered by respective optical bandpass filters 55a, 55b . . . 55n. This arrangement permits the use of an optical amplifier (not shown) to boost the signals along the cable 18x. Also, this arrangement provides a sample from each of the transmitters 19a, 19b . . . 19n without requiring means for selecting one of these transmitters, which may be advantageous since it allows a plurality of monitors to be simultaneously scanned by one operator.

Figure 3:
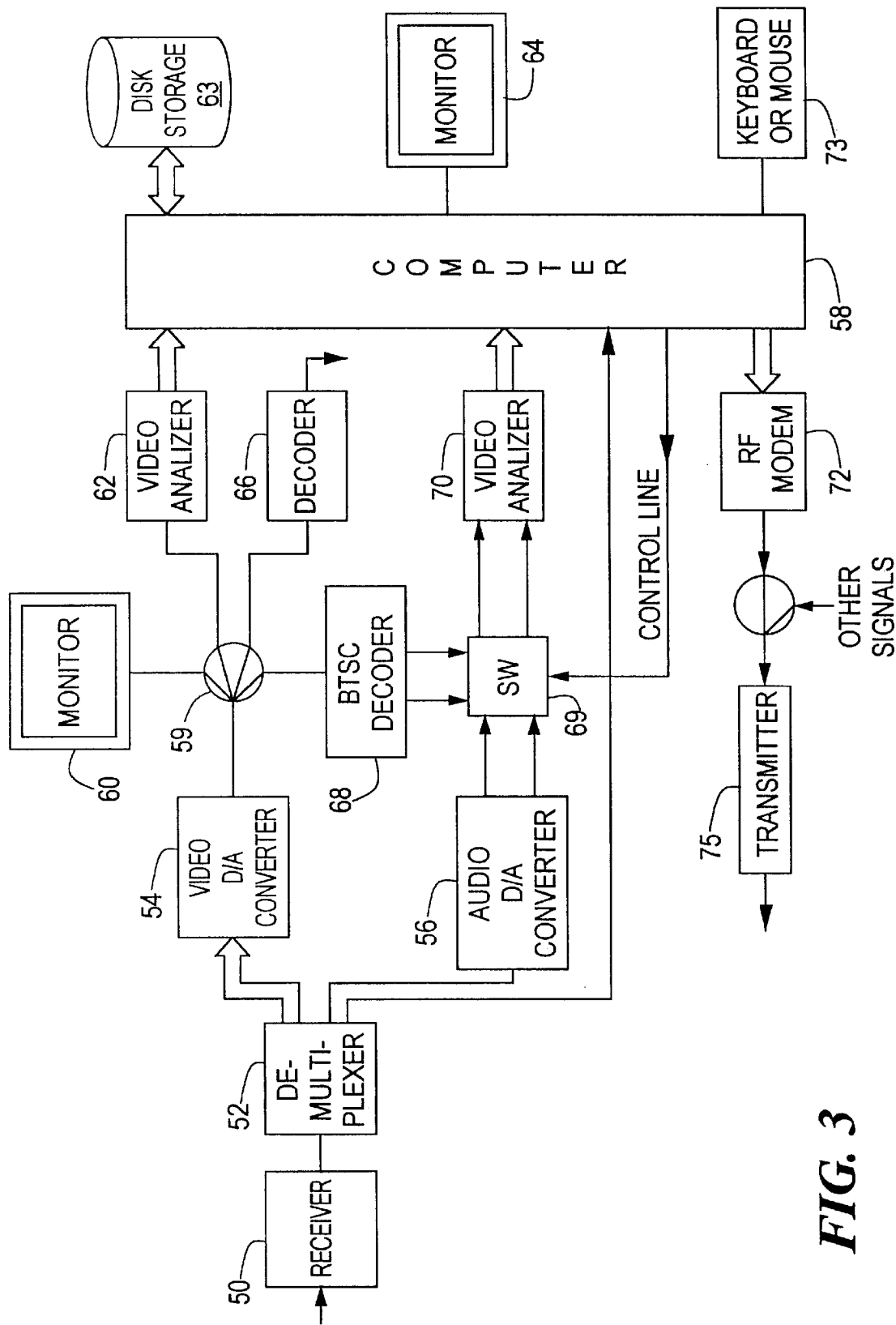
FIG. 3 shows parts of the monitoring system at a monitoring location.

The components of the monitoring unit 20 are shown in FIG. 3. These comprise a digital opto-electronic video receiver 50 connected to the cable 18, the receiver 50 being compatible with the transmitter 19a and feeding into a demultiplexer 52. Eight bits of a 10 bit output bus of the demultiplexer 52 go to a video digital-to-analog converter 54 to reconstitute the video signal and its sub-carriers. An audio bit bus goes to an audio digital-to-analog converter 56 and a third data bit bus goes directly to a control computer 58 for analysis of the digitized performance information.

The video digital-to-analog converter 54 provides a baseband signal output which contains both video and audio information which is a representation of the signal as encoded at the channel selector 14a, 14b . . . 14n. To analyze this information, the output is split by a splitter 59 into four paths. A main path extends to a video monitor 60 which displays a video image for visual analysis of the signal. The monitor 60 will show distortions present in the signal which may not be measurable by any other means. Such distortions are usually manifest as bars or narrow lines at some angle across the screen and will either move or be stationary. A second path is used as input to a video analyser 62, which in the present embodiment of the invention comprises a Tektronix VM 700, manufactured by Tektronix Inc., of Beaverton, Oreg. The video analyzer 62 measures signal quality parameters such as signal-to-noise ratio, differential gain, differential phase and other video parameters referenced in the video specification EIA RS-250. The data from the video analyzer 62 is acquired by the control computer 38 and displayed on a computer monitor 64.

The computer 58 compares the present values of these video parameters to reference data, stored on a hard drive 63 in the computer 58, to monitor the performance over a period of time. By automating this process, the computer 58 monitors the system performance by polling, i.e. by requesting data from each channel selector 14a, 14b . . . 14n and making the required comparisons on a continuous basis.

A third leg from the splitter 59 is fed to a decoder 66, which can demodulate information encoded in the video signal, for example channel insertion (used for advert deletion and substitution), scrambler and set top information. This information can be checked for accuracy, assessed for errors and displayed by a computer monitor 64.

A fourth leg from the splitter 59 is fed to a BTSC stereo audio decoder 68 which recreates the left and right audio channel from the BTSC standard signal.

The audio digital-to-analog converter 56 recovers two audio channels, which may comprises the left and right stereo signals and provides them as inputs to a switch 69, which is controlled by the control computer 58 through a control line 71 and which selects either the locally decoded stereo signal from the BTSC decoder 68 or the remotely decoded signal from the digital-to-analog connecter 56 as input to an audio analyzer 70. The audio analyzer 70 performs measurements of parameters such as signal-to-noise ratio and harmonic distortion. The outputs of the audio analyzer 70 are fed to the computer 58 for analysis, comparison and display in a manner similar to the video information.

The digital carriers derived from the microprocessor in the field contain encoded information such as video level, video carrier frequency, audio carrier level, audio carrier frequency plus other digitally encoded information such as temperature at the site or in the equipment, relative humidity and status of the amplifier or site equipment. Other digital bitstreams, e.g. telephone or 56 kb/sec channels, separate from the function of this equipment could also be included.

The computer 58 has an input device 73 in the form of a keyboard or mouse, by which an operator can input instruction with the computer 58 identifying the video signal channel which is to be selected and the location at which the selection is to be effected. The computer 58 then outputs corresponding data in the form of the channel selector control signal to an RF modem 72, which encodes the data by FSK encoding onto an RF carrier of a frequency chosen not to interfere with the video signal on the cable 11. QPSK encoding may alternatively be employed.

The RF carrier is then supplied to a transmitter 75 at the headend 10 for transmission along the cable 11 to the respective channel selector 14*a*, 14*b* . . . 14*n*. The computer 58 thus comprises a channel selection control signal generator for controlling the channel selection by the respective channel selector 14*a*, 14*b* . . . 14*n*.

Figure 4:
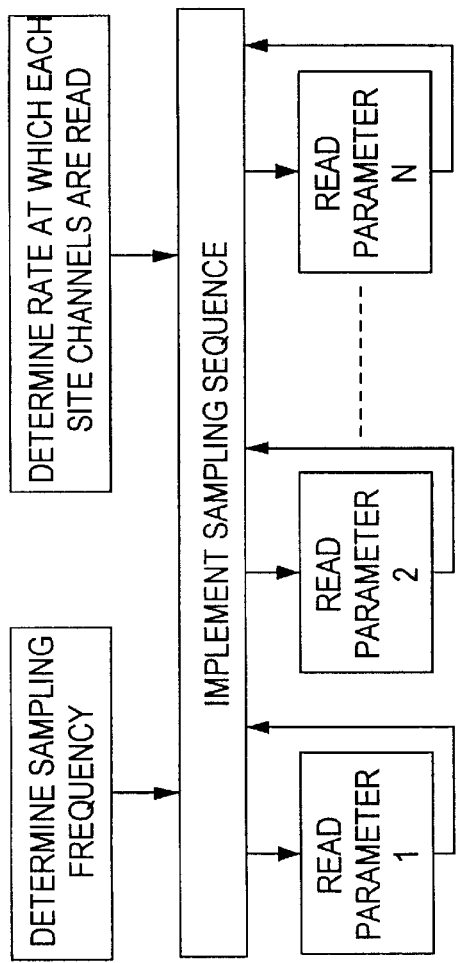
FIGS. 4 and 5 are diagrams illustrating the operation of a computer forming part of the monitoring system of FIG. 1A.

FIG. 4 shows the sequence for initializing the measurements and collecting the results in the computer 58. Two operator parameters input into the computer 58 by the input device 73 are the frequency of sampling and the sampling rate for each site and channel. The former determines the number of samples that comprises a reading and typically would be averaged. The second determines how long the measurements are taken at each site and which channels are measured. It could arise that a particular channel is of more interest than others, either because it is being used to transmit a test signal for system performance evaluation or because of a suspected frequency-related problem with the system. A test signal has the advantage that it is a steady state condition and hence enables more accurate performance measurements.

Figure 5:
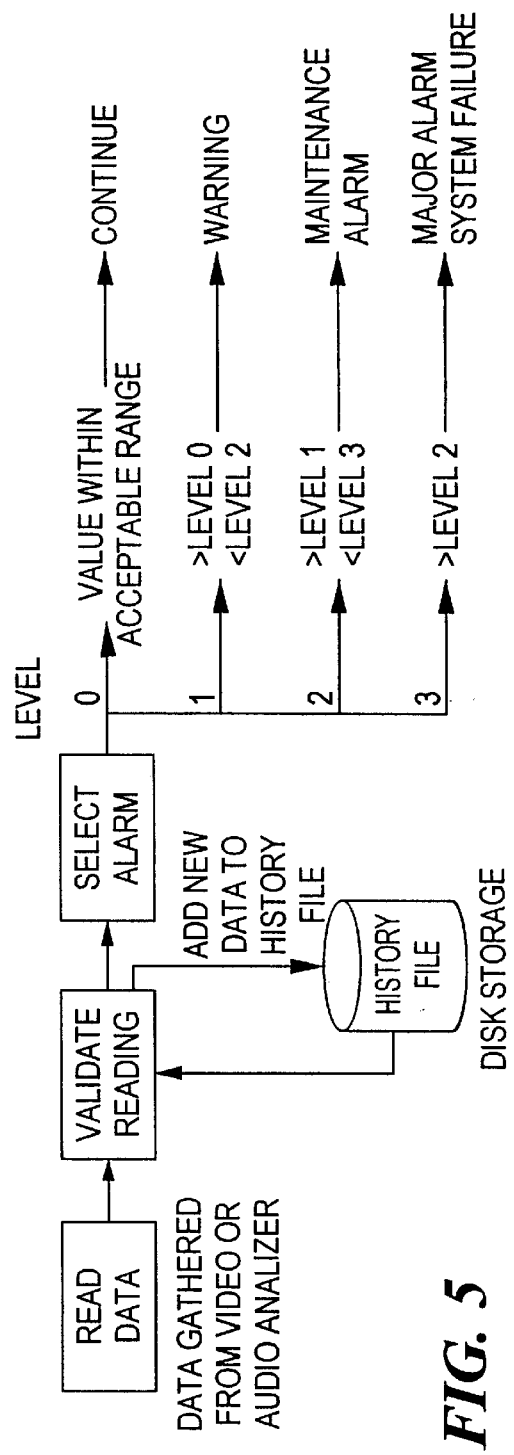

FIG. 5 shows the measurement validation procedure. A reading taken as part of the routine of FIG. 4 is compared to data stored on the hard disk 63. The difference between that reading and the stored data could be either:

No change from previous reading or baseline data, i.e. within prescribed limits.

Within limits of both initial reading and previous reading, but each reading is exhibiting trend to greater deviation from baseline data. (Warning)

Outside limits set for baseline data, but within limits of change for previous reading (indicates drift and therefore a maintenance condition) (Maintenance Alarm).

Outside both limits from baseline data, and outside range of previous reading. Indicates:—Major maintenance requirement or system failure Major Alarm; Activate back up system if available.

The system performance parameter to be monitored is selected by programming. Such a parameter might be video signal-to-noise ratio. The value gathered is validated by comparison with stored data representing both a range of acceptable values predetermined at the time of the system commissioning and an indication of change in the parameter being measured over the value obtained at the previous reading. The amount of the change or deviation gives rise to varying levels of alarms according to the severity as outlined above.

The diagnosis routine is described in the following truth table. The routine determines the type of failure and its location. When an alarm is displayed in FIG. 5, the site, channel and the type of failure are known.

| Preceding | Present | Subsequent | Possible Diagnosis |
|---|---|---|---|
| Single Channel | | | |
| ✓ | ✓ | ✓ | Channel OK |
| X | X | X | Repeat procedure making preceding site present site, if first site OK then headend failure |
| ✓ | X | X | Check all channels, if OK, then monitor equipment maintenance required |
| ✓ | ✓ | X | Repeat procedure making subsequent site present site |
| ✓ | X | ✓ | Monitor equipment maintenance required |
| All Channels | | | |
| ✓ | ✓ | ✓ | System OK |
| X | X | X | Repeat procedure making preceding site present site, if first site OK then headend failure |
| ✓ | X | X | Equipment at present site requires maintenance |
| ✓ | ✓ | X | Repeat procedure making subsequent site present site |
| ✓ | X | ✓ | Monitor equipment maintenance required |

We claim:

1. An analog video signal-monitoring apparatus, comprising:

an input for an analog video signal receiver;

a channel selector connected to said input and operable in response to a control signal to select a video signal channel;

a digitizer operable to digitize and serialize the selected signal channel as a digital video signal;

a transmitter for transmitting the digital video signal from said digitizer to a monitoring location;

a video signal-monitoring unit responsive to the digital video signal for use at the monitoring location, said video signal-monitoring unit capable of providing observation of actual pictures from said video signal for visual and quantitative analysis; and a channel selector control signal generator operable to provide the control signal to said channel selector.

2. An analog video signal monitoring apparatus as claimed in claim 1, further comprising means for deriving signal quality data relating to the quality of the signal channel selected by said channel selector, means for digitally encoding the thus-derived signal quality data, means for supplying the digitally encoded signal quality data to the monitoring location and means at the monitoring location for decoding and analysing the signal quality data.

3. An analog video signal monitoring apparatus as claimed in claim 1, wherein said transmitter comprises an opto-electronic transmitter.

4. An analog video signal monitoring apparatus as claimed in claim 1, wherein said input comprises a video signal receiver and a splitter for connecting said receiver to a cable transporting the analog video signal.

5. An analog video signal monitoring apparatus as claimed in claim 1, wherein said channel selector comprises a video signal down converter for converting the video signal to an intermediate frequency, a phase locked loop controlling said down converter, a first demodulator connected to an output of said down converter, an audio demodulator connected to said first demodulator and a microprocessor responsive to signal quality data from said down converter, said phase locked loop, said first demodulator and said audio demodulator for digitally encoding the data.

6. An analog video signal monitoring apparatus as claimed in claim 4, further comprising a multiplexer responsive to said digitizer and said microprocessor for multiplexing the digitally encoded signal quality data and the digital video signal for transmission by said transmitter.

7. An analog video signal monitoring apparatus as claimed in claim 1, wherein said receiver includes means for digitally encoding local status information for transmission by said transmitter to the monitoring location.

8. An analog video signal monitoring apparatus as claimed in claim 1, wherein said channel selector includes a digital receiver for receiving digital information from a further channel selector and a switch operable to selectively connect either one of said channel selectors to said video signal monitoring unit.

9. An analog video signal-monitoring apparatus for detecting and monitoring an analog video signal being transported on a cable, comprising:
 a signal receiver for receiving the analog video signal from said cable;
 a channel selector connected to said signal receiver for selecting a channel from the received analog video signal in response to a control signal from said cable;
 means connected to said channel selector for digitizing and serializing the selected signal channel as a digital video signal;
 means for transmitting the digital video signal to a monitoring location, said monitoring location capable of providing observation of actual pictures from said video signal;
 means for analyzing the digital video signal at the monitoring location;
 signal link means between said transmitting means and said signal analysis means for conveying the digital video signal to the latter; and
 signal generator means for generating the control signal and supplying the control signal through said cable to said channel selector.

10. An analog video signal monitoring apparatus as claimed in claim 9, wherein said channel selector includes means for deriving digitally encoded signal quality data relating to the quality of the analog video signal, and means for supplying the digitally encoded signal quality data to the monitoring location, said apparatus further including means at the monitoring location for analysing the digitally encoded signal quality data.

11. An analog video signal monitoring apparatus as claimed in claim 10, wherein said channel selector further comprises multiplexer means for multiplexing the digital video signal and the digitally encoded signal quality data to provide a multiplexed signal to said transmitter.

12. An analog video signal monitoring apparatus as claimed in claim 9, further comprising an optical filter signal conduit connecting said transmitter to the monitoring location, said transmitter comprising an opto-electronic transmitter, and the monitoring location containing an opto-electronic receiver connected to said signal conduit for receiving the digital video signal.

13. An analog video signal-monitoring system comprising:
 signal-detecting apparatus for detecting an analog video signal, said signal detecting apparatus comprising:
  an analog signal receiver;
  a channel selector connected to said signal receiver and operable in response to a control signal to select a channel;
  a digitizer connected to said channel selector for digitizing and serializing the selected signal channel as a digital video signal; and
  a transmitter for transmitting the digital video signal from said digitizer to a monitoring location;
 said system further comprising:
  a signal conduit extending from said transmitter to the monitoring location; and
  a video signal-monitoring unit responsive to the digital video signal at the monitoring location;
  said monitoring unit capable of providing observation of actual pictures from said video signal, said monitoring unit including a receiver connected to said signal conduit for receiving the digital signal, video signal analysis apparatus connected to an output of said receiver and a channel selector control signal generator for providing the control signal to said channel selector.

14. An analog video signal monitoring system as claimed in claim 13, wherein said signal selector includes means for supplying to said transmitter digitally encoded signal quality data derived from the selected signal channel, and said system including means for decoding and analysing the signal quality data at the monitoring location.

15. An analog video signal monitoring system as claimed in claim 13, wherein said signal detecting apparatus is one of a plurality of signal detector apparatuses connected to said video signal monitoring unit by said signal conduit.

16. An analog video signal monitoring system as claimed in claim 15, wherein said signal detector apparatuses each include a digital receiver connected to said signal conduit for receiving a digital video signal from another of said signal detector apparatuses and a switch operable to selectively connect the respective one of said channel selectors or said digital receiver to said transmitter.

17. An analog video signal monitoring system as claimed in claim 12, wherein said signal detector apparatus is one of a plurality of signal detector apparatuses, said system further comprising a plurality of digital receivers at the monitoring location and a plurality of signal conduits connecting said signal detector apparatuses to respective ones of said digital receivers.

18. A method of monitoring the transmission of an analog video signal, comprising the steps of:
 receiving the video signal at a predetermined location;
 employing a control signal to select a channel of the received video signal;
 digitizing and serializing the thus-selected channel as a digital video signal;
 transmitting the digital video signal to a monitoring location capable of allowing observation of actual pictures from said video signal;
 monitoring the digital video signal at the monitoring location and;
 transmitting the control signal to the predetermined location to effect remote control of the channel selection.

19. A method as claimed in claim 18, which includes deriving signal quality data indicative of the quality of the selected channel at the predetermined location; digitizing the thus-derived signal quality data, transmitting the digitized signal quality data from the predetermined location to a receiver and analysing the digitized data at the monitoring location.

20. A method as claimed in claim 19, which includes multiplexing the digital video signal and the signal quality data at the predetermined location for transmission to the monitoring location and de-multiplexing the digital video signal and the signal quality data at the monitoring location.

21. A method as claimed in claim 18, which includes converting the digital video signal to an analog video signal and displaying the latter as a video image on a monitor at the monitoring location.

22. A method as claimed in claim 18, which includes converting the digital video signal to an analog video signal and analysing the latter in a video analyser at the monitoring location to obtain signal quality values.

23. A method as claimed as claim 22, which includes storing references values and comparing the stored reference values with the signal quality values obtained by the video analyser.

24. A method as claimed as claim 18, which includes receiving the analog video signal at a plurality of different predetermined locations and, at each of said predetermined locations, effecting channel selection of the analog video signal, and digitizing and serializing the selected channels to provide respective digital video signals the method further including selecting the digital video signals to monitor them separately at the monitoring location.

25. A method as claimed in claim 24, which includes polling the plurality of predetermined locations from the monitoring location to control the channel selection and the selection of the digital video signals.

26. A method as claimed in claim 25, which includes transmitting the digital video signals through a common signal conduit from the predetermined locations to the monitoring location and in which the step of selecting the digital video signals comprises switching the digital video signals at the predetermined locations.

27. A method as claimed in claim 24, which includes transmitting the digital video signals at different respective frequencies through a common signal conduit from the predetermined locations to the monitoring location, the selection of the digital video signals comprising filtering the digital video signals at the monitoring location.

28. A method as claimed in claim 18, in which the step of transmitting the step of transmitting the digital video signal to the monitoring location comprises transmitting the digital video signal through a video transmission cable also employed for transmission of the analog video signal.

* * * * *